United States Patent [19]

Murray et al.

[11] Patent Number: 4,822,841

[45] Date of Patent: Apr. 18, 1989

[54] STRONG AND ELASTIC POLYURETHANE, POLYUREA, POLYARYLATES AND ELECTRON BEAM-CURED COATINGS CONTAINING THE SAME

[75] Inventors: Kevin P. Murray; Robert E. Ansel, both of Hoffman Estates; Steven R. Schmid, Buffalo Grove, all of Ill.

[73] Assignee: DeSoto, Inc., Des Plaines, Ill.

[21] Appl. No.: 104,966

[22] Filed: Oct. 6, 1987

[51] Int. Cl.$^4$ .................... C08G 18/08; C08G 18/16; C08F 283/04; C08L 75/02

[52] U.S. Cl. .................................. 524/356; 524/360; 524/590; 524/589; 525/455; 528/49

[58] Field of Search ............... 528/75, 49; 524/356, 524/360, 590, 589; 525/455

[56] References Cited

U.S. PATENT DOCUMENTS

| | | | |
|---|---|---|---|
| 3,483,167 | 12/1969 | Sommer et al. | 528/49 |
| 4,264,752 | 4/1981 | Watson, Jr. | 528/75 |
| 4,314,922 | 2/1982 | Lehner et al. | 528/75 |
| 4,425,468 | 1/1984 | Makhlouf et al. | 528/75 |
| 4,581,407 | 4/1986 | Schmid | 528/49 |
| 4,716,209 | 12/1987 | Schmid et al. | 528/75 |
| 4,720,529 | 1/1988 | Kimura et al. | 528/75 |
| 4,721,751 | 1/1988 | Schappert et al. | 528/75 |

*Primary Examiner*—John Kight
*Assistant Examiner*—Dennis R. Daley
*Attorney, Agent, or Firm*—Dressler, Goldsmith, Shore, Sutker & Milnamow, Ltd.

[57] ABSTRACT

An essentially isocyanate-free polyurethane, polyurea, polyethylenic oligomer is disclosed which is unusually strong and elastic and which possesses improved solvent solubility. This oligomer is the reaction product of: (1) organic diisocyanate; (2) a stoichiometric deficiency of difunctional materials reactive therewith and consisting essentially of: (A) diol component selected from polycarbonate diol and polyoxyalkylene glycol, this diol component having a molecular weight of from 200 to 2000; (B) dihydric bisphenol-based alkylene oxide adduct containing from 2-6 alkylene groups per molecule; and (C) a diprimary diamine component selected from alkylene diamine and polyoxyalkylene diamine, this diamine component having a molecular weight of from about 60 to 800. Components (A) and (B) are present in a mole ratio of, from 1:1.5 to 1:5 and component (C) is present to supply from 5 to 30 equivalent percent of the total equivalents of component (2). The polyurethane polyurea so-constituted is capped with monohydric ethylenic compound, such as 2-hydroxyethyl acrylate, to provide a molecular weight in the range of about 5,000 to about 30,000.

This polyethylenic oligomer is cured by radiation exposure, as from an electron beam, and a polyethylenic cross-linking agent may be used to enhance the cure. The coating compositions are preferably pigmented and diluted to a resin solids content of about 5% to 15%, at which dilution they exhibit superior resistance to precipitation.

18 Claims, No Drawings

STRONG AND ELASTIC POLYURETHANE, POLYUREA, POLYARYLATES AND ELECTRON BEAM-CURED COATINGS CONTAINING THE SAME

DESCRIPTION

This application is an improvement over our prior application application Ser. No. 824,547 filed Jan. 23, 1986, now U.S. Pat. No. 4,716,209.

Technical Field

This invention relates to polyurethane, polyurea, polyacrylate polymers, preferably diacrylates, and to coating compositions containing the same which cure on electron beam exposure to form strong elastic films.

Background Art

It is known that polyethylenically unsaturated oligomers which are usually polyacrylates, including polyurethane polyacrylates, can be cured using electron beam radiation. However, when the electron beam-cured films have a tensile strength greater than about 5,000 psi., they tend to be brittle and break before they elongate 100% of their initial length. When the electron beam-cured films are sufficiently extensible to avoid breaking until after they stretch 100%, then they tend to be weak and unable to resist tensile forces greater than 5,000 psi. Moreover, when strength and elongation are usefully combined, the cured films will frequently lack high modulus, and it is preferred to provide films having a tensile modulus in excess of 50,000 and a rupture energy in excess of 10,000 inch pounds per cubic inch. It is particularly desired to combine a tensile strength in excess of about 5,000 psi. with an elongation in excess of 200% and a rupture energy in excess of 10,000 inch pounds per cubic inch since this combination is especially effective in providing iron oxide-pigmented coatings for magnetic media.

The properties referred to above are measured on an electron beam-cured unpigmented free film having a thickness of about 1 mil.

In the noted prior application, the composition containing the polyethylenic oligomers must be diluted with organic solvent to provide the pigmented coatings of prime interest to us, usually down to around 10% resin solids content. At about this level of dilution with organic solvent, the oligomers begin to precipitate out of the solution, and this introduces undesired variations and other difficulties. This lack of solvent solubility is attributed to the excessive proportion of the diamine component of the oligomer which is needed in the prior application to provide the desired high tensile modulus. But when we reduced the proportion of diamine, the tensile modulus suffers and becomes unacceptable. This invention attempts to reduce the proportion of diamine component while retaining the desired high tensile modulus.

DISCLOSURE OF INVENTION

In accordance with this invention, a radiation-curable liquid coating composition is provided which comprises volatile inert organic solvent having dissolved therein a radiation-curable polyurethane, polyurea, polyethylenic oligomer of special character. While these oligomers cure very well by themselves, they are usually combined with a polyethylenic cross-linking agent, preferably from 5% to 25% of total polymer solids, of a polyhydroxyalkyl melamine in which the alkyl group contains from 2–4 carbon atoms and there are an average of from 2.4 to 3.0 hydroxyalkyl groups per molecule, this polyhydroxyalkyl melamine being reacted with an ethylenic compound to provide at least 2.5 up to about 3.0 ethylenic groups per molecule.

The preferred unsaturated groups are acrylate groups, since these are the most rapidly curable.

The preferred coatings are pigmented, as with magnetizable iron oxide particles, and cured with electron beam radiation. Conventional photoinitiators, like benzophenone and the like, can be added to permit ultraviolet cure, either in clear coatings or in coatings where the pigment content does not unduly absorb the ultraviolet light.

The polyurethane, polyurea, polyacrylate oligomer which is employed is essentially isocyanate-free and comprises the capped reaction product of: (1) organic diisocyanate; (2) a stoichiometric deficiency, based on the diisocyanate, of difunctional materials reactive with isocyanate functionality, and (3) a monohydric ethylenic capping agent, preferably an acrylate or polyacrylate.

Component (2) consists essentially of: (A) diol component having a molecular weight of from 200 to 1500 and selected from polycarbonate diol and polyoxyalkylene glycol in which the alkylene group contains from 2–4 carbon atoms; (B) dihydric bisphenol-based alkylene oxide adduct in which the alkylene group contains from 2–4 carbon atoms and containing from 2–6 alkylene groups per molecule; and (C) a diprimary diamine component having a molecular weight of from about 60 to 800 and selected from alkylene diamine and polyoxyalkylene diamine in which the alkylene groups contain from 2–4 carbon atoms.

Components (A) and (B) are present in a mole ratio of from 1:1.5 to 1:5, and component (C) is present in an amount of from 5 equivalent percent to 30 equivalent percent, more preferably from 5 equivalent percent to 20 equivalent percent of the total equivalents of component (2).

The polyurethane polyurea of components (1) and (2) is capped by (3) a monohydric ethylenic compound, preferably an hydroxyalkyl acrylate in which the alkyl group contains from 2–4 carbon atoms, and the proportion of the ethylenic compound provides an ethylenically unsaturated oligomer having a molecular weight in the range of about 5,000 to about 30,000.

As will now be apparent, this invention is based on the finding that if we increase the proportion of dihydric bisphenol-based alkylene oxide adduct above that previously used, we can reduce the proportion of the diamine component while retaining high tensile modulus, and the solubility is greatly improved. More particularly, while precipitation was previously encountered at resin solids contents of about 10%, which is at the level of dilution previously needed in commerce, we can now add solvent to provide dilutions down to about 1% without encountering precipitation of the oligomer component of the composition. In order to make the required changes, some of the other parameters of the composition have been modified, most importantly the mole ratio of components (A) and (B) has been narrowed with component (B) now being required to be in molar excess.

The term "polyacrylate" denotes a plurality of acrylic acid groups, and this is one accepted use of this term. Also, the term "oligomer" is a common one, and denotes relatively low molecular weight polymers having a small number of units, e.g., from about 2 to about 20.

Referring more particularly to the essentially isocyanate-free polyurethane, polyurea, polyethylenic oligomer used herein, this oligomer is preferably based on an aliphatic diisocyanate to provide the desired elasticity. Aromatic diisocyanates, like toluene diisocyanate and diphenyl methane diisocyanate, produce oligomers which are less flexible, but may still be used herein, especially in admixture with aliphatic diisocyanates. The preferred aliphatic diisocyanates are known and are preferably illustrated herein by 4,4'-methylene-bis(cyclohexylisocyanate) which is available in commerce from Mobay under the trade designation Desmodur W. Other useful diisocyanates are diisocyanate derivatives of saturated aliphatic or cycloaliphatic compounds containing from 2–12, preferably 2–9 carbon atoms, such as isophorone diisocyanate. 2,2,4-trimethyl-hexamethylene diisocyanate will further illustrate the class of useful diisocyanates.

The organic diisocyanate is combined with a stoichiometric deficiency, based on the diisocyanate, of difunctional materials reactive with isocyanate functionality. This deficiency leaves room for capping with a monohydric ethylenic compound, preferably an acrylate, so the deficiency used and the proportion of monohydric ethylenic compound, determines the molecular weight which will be obtained using components of any given molecular weight. Molecular weight is important to this invention and will be discussed hereinafter.

The difunctional materials reactive with isocyanate functionality must be of three different types and consist essentially of: (A) diol component selected from polycarbonate diol and polyoxyalkylene glycol in which the alkylene group contains from 2–4 carbon atoms (3 carbon atoms being preferred), this diol component having a molecular weight of from 200 to 2000, preferably 500 to 1100; (B) dihydric bisphenol-based alkylene oxide adduct in which the alkylene group contains from 2–4 carbon atoms, 2 or 3 being preferred, and containing from 2–6 alkylene groups per molecule; and (C) a diprimary diamine component selected from alkylene diamine and polyoxyalkylene diamine in which the alkylene groups contain from 2–4 carbon atoms, preferably 3 carbon atoms, this diamine component having a molecular weight of from about 60 to 800, preferably from 175 to 400.

It is stressed that the diprimary amine provides toughness and strength in the combination, but it must be used in combination with the two different dihydric alcohols. When the diol component is used alone, the tendency is to provide cured products which lack strength and which are even more deficient in tensile modulus. On the other hand, when the dihydric bisphenol adduct is used alone, the cured products are quite brittle. It is only when the two different dihydric materials are combined in the combination of this invention, that high strength, high elongation and high modulus can be simultaneously achieved with the smaller proportions of diamine component now used to enhance solvent solubility.

The useful polyoxyalkylene glycols are illustrated by polyethylene glycols, polypropylene glycols, and polytetramethylene glycols. Any of these having a molecular weight of from 200 to 2000 can be used. It is preferred, however, to use a polycarbonate diol in place of the polyoxyalkylene glycol. The useful polycarbonate diols have the formula:

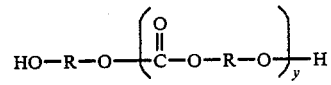

in which R is alkylene group containing 2–12 carbon atoms, such as 1,4-butane diol, 1,6-hexane diol, or 1,8-octane diol, and y is at least one and provides a molecular weight within the specified range.

It should be noted that identification of the molecular weight of the reactive materials is obtained by assuming the difunctional structure and calculating the molecular weight from the measured reactive functionality. This definition of molecular weight is a number average molecular weight and is employed unless otherwise stated.

The dihydric bisphenol-based alkylene oxide adduct is illustrated by alkylene oxide adducts of bisphenol A, which is the preferred bisphenol because of the 4,4' positioning of its two OH groups. The adduction reaction is itself conventional, and one can adduct on ethylene oxide, propylene oxide or butylene oxide, depending upon the availability of pressure equipment to handle the ethylene oxide. The propylene oxide adduct of bisphenol A having a molecular weight of 350 is now preferred. The product supplied by Akzo Chemie America under the trade designation Dianol 33 may be used to supply the propoxylated bisphenol A referred to.

The useful alkylene diprimary diamines are illustrated by hexamethylene diamine, 1,4-butane diamine, 1,6-hexane diamine, and dodecyl diamine. The preferred diamines are polyoxyalkylene diamines, including polyoxyethylene diamines and polyoxybutylene diamines. The preferred polyoxyalkylene amines have a molecular weight of from 175 to 400, and are illustrated by a polyoxypropylene diamine having a molecular weight of about 230. These react with isocyanate functionality to provide urea groups which add to the strength of the oligomer in the cured films of this invention. These diamines provide a portion of component 2 of the oligomers used herein, and preferably provide from 5 equivalent percent to 20 equivalent percent of the total equivalents of component (2).

The monohydric ethylenic compounds which are preferably acrylates are more preferably adducts of an alkylene oxide with acrylic acid. 2-hydroxyethyl acrylate is preferred and is used herein as illustrative, though the corresponding products made with propylene oxide or butylene oxide are also fully useful, as is monohydric dicaprolactone monoacrylate which is the reaction product of 2-hydroxyethyl acrylate with epsilon caprolactone which forms a dimer under the reaction conditions. The caprolactone monoacrylate can be obtained from Union Carbide Corporation under the trade designation Tone M 100. Monohydric polyacrylates are also useful, such as pentaerythritol triacrylate and its monohydric dimer. These acrylates can be replaced by the corresponding methacrylates and itaconates, though this is less preferred.

The monohydric ethylenic compound provides terminal ethylenic unsaturation for cure, and also serves as a monofunctional chain terminator. As a result, the larger the proportion of monohydric unsaturated compound, the lower the molecular weight of the polymeric product, having due regard for the molecular weight of the individual components of the polyurethane polyurea. These factors are adjusted to provide an essentially isocyanate-free polyethylenic oligomer having a molecular weight (number average) within the previously defined range. While one can broadly use anything from 5,000 to about 30,000 (which is the upper limit of production capacity), the lower molecular weights of from 6,000 to 20,000 provide the best combination properties on curing.

While freedom from isocyanate should limit this functionality to not more than a trace in the final product, the products which have been produced herein have contained no detectable isocyanate functionality, and this is preferred practice.

The reaction with the isocyanate groups is entirely conventional being usually carried out at moderate temperature in the presence of a catalyst which promotes the urethan-forming reaction, such as dibutyl tin dilaurate. It is customary to limit the temperature to about 60° C., and this can be done by slowing the rate of addition of one of the components, such as the diamine component which is more highly reactive than the hydroxy components. The order of reaction is largely immaterial, it being possible to bring in the monohydric ethylenic compound either at the beginning, during the middle of the procedure, or as the last reactant. All of these variations are known in the art.

It is presently preferred to add the diamine component after the monohydric ethylenic compound, or just before it when that ethylenic compound is the last component added. It is also usual herein to employ the diisocyanate and the materials reactive therewith in stoichiometric amounts and to continue the reaction until the isocyanate functionality is substantially undetectable.

As will be understood, these reactions are conveniently carried out in solvent solution, this being illustrated using the preferred tetrahydrofuran to maintain the liquid condition as the reaction proceeds to progressively increase the molecular weight in the reactor.

The cross-linking agent which may be used in the preferred practice of this invention can vary considerably. Thus, one may substitute less preferred cross-linking agents for those which will now be disclosed.

Using the most preferred ethylenically unsaturated cross-linking agent as illustrative, these are polyacrylates. Many polyacrylate cross-linking agents are available, such as trimethylol propane triacrylate or pentaerythritol triacrylate, and these are available with the same acrylate functionality used herein. However, these polyacrylates lead to cured products having reduced extensibility, and do not provide the preferred combination of properties which this invention seeks and which are so unusual.

The cross-linking agents preferably used herein are ethylenically unsaturated polyhydroxyalkyl melamine in which the alkyl group contains from 2-4 carbon atoms. These are formed by the adduction of an alkylene oxide, such as ethylene oxide, propylene oxide or butylene oxide with melamine to form an average of from 2.4 to 3.0 hydroxyalkyl groups per molecule. The preferred hydroxyalkyl groups are hydroxypropyl groups, and these are illustrated herein by a polyhydroxypropyl melamine containing about 3.0 terminal hydroxypropyl groups per molecule. Such a polyhydroxypropyl melamine is available in commerce from American Cyanamid Company, Wayne, N.J., under the trade designation Melpol 125. This product, has a molecular weight of about 275. It is desired to place at least 2.4 unsaturated groups on this polyhydroxypropyl melamine base structure, and this can be done by esterification with acrylic acid, or preferably, by prereacting a monohydric acrylate of the type described previously, preferably 2-hydroxyethyl acrylate, with one molar proportion of an organic diisocyanate, such as isophorone diisocyanate, or toluene diisocyanate, to form a monoisocyanate monoacrylate. This monoisocyanate monoacrylate is reactive with both amino hydrogen atoms and hydroxy groups, so it reacts easily with the polyhydroxypropyl melamine. In this way, one can obtain an adduct having up to about 3.0 moles of acrylate functionality per mole of melamine. The resulting product is a solid at room temperature, it has a molecular weight (by calculation) of about 1290, and is used in solution. In the examples hereinafter, it will be used in methyl ethyl ketone solution at 65% solids.

The methacrylates corresponding to those referred to above are also useful. A commercially available isocyanate-functional methacrylate is isocyanatoethyl methacrylate.

Another type of polyethylenically unsaturated cross-linking agent which provides reasonably good results is an diepoxide diester, such as a diester with acrylic acid.

Referring first to the diepoxides which are used, these are preferably diglycidyl ethers of a bisphenol, typically bisphenol A. The term diglycidyl ether here denotes a product having at least 1.8 oxirane groups per molecule, and substantially all of these oxirane groups are consumed in the production of the desired acrylate diester, as will be discussed. The diglycidyl ether used must have a molecular weight in the range of about 560 to about 2000, more preferably from 700 to 1200. All molecular weights herein are number average molecular weights. When the molecular weight is below the required range, the final products are too brittle. When the molecular weight is above the required range, the viscosity is excessive.

The diepoxides which have been described are esterified with an ethylenically unsaturated acid which is preferably an acrylic acid, most preferably acrylic acid itself. All of the epoxy functionality is consumed by reaction with a stoichiometric proportion of the acid. The esterification is a simple adduction reaction which is normally carried out by simple heating in the presence of an esterification catalyst, and is entirely conventional.

While acrylic acid itself is the acid of choice, a derivative of acrylic acid, such as an ester of acrylic acid with a lactone, such as epsilon caprolactone, also provides preferred results.

These epoxy diacrylates are illustrated in commerce by Shell Chemical Company product DRH 370 (now supplied by Cangill Chemical Company under the designation Cangill 1570).

The coating compositions which are paraticularly contemplated contain magnetizable particles (treated or untreated iron oxide) dispersed in a liquid vehicle comprising the polymer solids described herein which contain inert volatile organic solvents to provide the needed liquidity. Typical solvents include aromatic solvents, like toluene, cycloaliphatic solvents, such as cyclohexanone, and heterocyclic solvents, such as tetrahydrofuran. The last named is preferred, for the production of the oligomer, as will be exemplified. Upon pigmentation and dilution to desired solids content, normally in the range of 5% to 15% by weight without regard to the pigment content, the solvents used for dilution are usually methyl ethyl ketone, tetrahydrofuran, or cyclohexanone, but preferably methyl ethyl ketone. All of these, and especially methyl ethyl ketone, introduce solubility problems with our prior oligomers, and these solubility problems are overcome herein.

Based on 100 parts of nonvolatile polymer solids, which includes the polyethylenic oligomer and the polyethylenic polyhydroxyalkyl melamine, it is preferred to employ from 50 to 500 parts of inert volatile solvent, preferably from 100 to 400 parts. These solvents are removed, preferably by vaporization at room or slightly elevated temperature, prior to electron beam curing. The films from which the solvents have been removed are normally solid tack-free films which are hardened and rendered solvent resistant by the electron beam exposure.

This liquid coating composition is preferably pigmented with magnetizable particles and applied as a wet solvent-containing film on a nonmagnetizable substrate, such as polyethylene terephthalate film, and the film is exposed to curing radiation after the solvent has been largely removed, as evidenced by the solid film usually formed.

Pigmentation with magnetizable particles in this invention will normally provide coating compositions having from 50% to 85% by weight of pigment particles based on the total weight of the cured coating. These pigmented compositions will desirably contain from 25% to 50% of total nonvolatile solids, balance volatile organic solvent.

Magnetizable particles and electron beam curing are preferred. However, one may use pigments to merely provide opacity or coloration, and in some instances ultraviolet curing may be used.

In this application, all proportions are by weight, unless otherwise stated, and the invention is illustrated in the examples which follow.

EXAMPLE

There is placed in a reaction vessel, 21 moles of 4,4'-methylene-bis (cyclohexylisocyanate) [Desmodur W may be used], 6 moles of polycarbonate diol based on 1,6-hexane diol and having a molecular weight of 1000, 12 moles of propoxylated bisphenol A of molecular weight 350 (Akzo Chemie America product Dianol 33 may be used), 16,000 grams of tetrahydrofuran and 15 gram of dibutyl tin dilaurate. This mixture is stirred and allowed to exotherm to 60° C.

After one hour at 60° C., 2 moles of 2-hydroxyethyl acrylate and 7.5 grams of phenothiazine are added and the mixture is held at 35° C. to 40° C. with stirring for an additional ½ hour. Then 500 grams of a tetrahydrofuran solution containing about 2 moles of polyoxypropylene diamime having a molecular weight of 230 and two primary amine groups (Texaco product Jeffamine D230 may be used) is added slowly to maintain a reaction temperature of 60° C. The exact amount of the diamine component is determined by titration or find the isocyanate content, and then enough diamine is added to consume all the isocyanate. The reaction is continued until free NCO could no longer be detected by infrared analysis, and then tetrahydrofuran is added to yield a 45% solvent solution having a viscosity of 15,000 centipoises. The polymeric product was found to have a number average molecular weight of about 15,000.

The solvent solution coating composition produced as above described is applied as a coating on Mylar film using a 3 mil Bird applicator which applies a wet coating about 3 mils thick. The coated Mylar is dried in air for 2 hours to provide a tack-free solid film having a thickness of about 1.5 mils. Exposure to an electron beam applying a 10 megarad dose of radiation at 175,000 volts provides a cured film having a tensile strength of about 5000 psi., an elongation of about 175%, and a tensile modulus of about 140,000 psi. at 2.5% elongation. These are remarkable properties, and they are enhanced when the compositions have curing agents added thereto as discussed herein and as illustrated in our prior application.

The cured films are cut off the Mylar substrate in order that these properties might be measured on the unpigmented free film.

Pigmented compositions using the solvent solutions described above are provided by adding pigment, such as magnetizable iron oxide pigment, to the solution to provide 40–50 volume percent pigment, based on total volume.

To illustrate the addition of cross-linking agent, it can provide 10% thereof based on the total weight of polyacrylate oligomer and cross-linking agent. When this is done with a typical pigmented composition, about 60-80% of the cured coating is pigment, and 20-40% is dry polymer.

These pigmented coating compositions are diluted to about 10% polymer content by the addition of volatile solvent, usually methyl ethyl ketone, and no precipitation is encountered.

What is claimed is:
1. An essentially isocyanate-free radiation-curable polyurethane, polyurea, polyethylenic oligomer comprising the reaction product of:
   (1) organic diisocyanate;
   (2) a stoichiometric deficiency, based on said diisocyanate, of difunctional materials reactive with isocyanate functionality; and consisting essentially of:
      (A) a diol component having a molecular weight of from 200 to 2000 and selected from polycarbonate diol and polyoxyalkylene glycol in which the alkylene group contains from 2–4 carbon atoms;
      (B) dihydric bisphenol-based alkylene oxide adduct in which the alkylene group contains from 2–4 carbon atoms and containing from 2–6 alkylene groups per molecule; and
      (C) a diprimary diamine component having a molecular weight of from about 60 to 800 and selected from alkylene diamine and polyoxyalkylene diamine in which the alkylene groups contain from 2–4 carbon atoms;
   said components (A) and (B) being present in a mole ratio of from 1:1.5 to 1:5 and said component (C) being present in an amount of from 5 equivalent percent to 20 equivalent percent of the total equivalents of component (2), the polyurethane polyurea of components (1) and (2) being capped by
   (3) monohydric ethylenically unsaturated compound; and the proportion of said monohydric ethylenically unsaturated compound providing a polyethylenically unsaturated oligomer having a molecular weight in the range of about 5,000 to about 30,000.

2. An oligomer as recited in claim 1 in which the ethylenic unsaturations are acrylate unsaturation.

3. An oligomer as recited in claim 1 in which said diisocyanate is an aliphatic diisocyanate.

4. An oligomer as recited in claim 3 in which said diisocyanate is 4,4'-methylene-bis(cyclohexylisocyanate).

5. An oligomer as recited in claim 1 in which said diol is a polycarbonate diol having the formula:

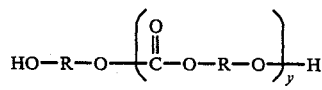

in which R is an alkylene group containing 2–12 carbon atoms and y is at least one.

6. An oligomer as recited in claim 1 in which said dihydric bisphenol-based alkylene oxide adduct is a propylene oxide adduct of bisphenol A.

7. An oligomer as recited in claim 1 in which said polyoxyalkylene diprimary amine is a polyoxypropylene diamine having a molecular weight of from 175 to 400.

8. An oligomer as recited in claim 1 in which said oligomer is capped with an hydroxyalkyl acrylate in which the alkyl group contains from 2–4 carbon atoms.

9. An oligomer as recited in claim 8 in which said oligomer is capped with 2-hydroxyethyl acrylate.

10. An oligomer as recited in claim 9 in which said oligomer has a molecular weight in the range of about 6,000 to about 20,000.

11. A radiation-curable liquid coating composition comprising volatile inert organic solvent having dissolved therein the polyurethane, polyurea, polyethylenic oligomer of claim 1 and from 5% to 25%, based on total polymer solids, of polyethylenically unsaturated cross-linking agent for said polyethylenic oligomer, said coating composition being pigmented to contain from 40 to 50 volume percent pigment and having a resin solids content in the range of 5% to 15%.

12. A coating composition as recited in claim 11 in which the solvent used for dilution is methyl ethyl ketone.

13. A coating composition as recited in claim 12 in which said unsaturated groups are acrylate groups.

14. A coating composition as recited in claim 12 in which said pigment particles are magnetizable particles.

15. An essentially isocyanate-free radiation-curable polyurethane, polyurea, polyethylenic oligomer comprising the reaction product of:
  (1) organic diisocyanate;
  (2) a stoichiometric deficiency, based on said diisocyanate, of difunctional materials reactive with isocyanate functionality; and consisting essentially of:
    (A) a polycarbonate diol component having a molecular weight of from 200 to 2000;
    (B) dihydric bisphenol-based alkylene oxide adduct in which the alkylene group contains from 2–4 carbon atoms and containing from 2–6 alkylene groups per molecule; and
    (C) a diprimary diamine component having a molecular weight of from about 60 to 800 and selected from alkylene diamine and polyoxyalkylene diamine in which the alkylene groups contain from 2–4 carbon atoms;
said components (A) and (B) being present in a mole ratio of from 1:1.5 to 1:5 and said component (C) being present in an amount of from 5 equivalent percent to 20 equivalent percent of the total equivalents of component (2), the polyurethane polyurea of components (1) and (2) being capped by
  (3) monohydric ethylenically unsaturated compound; and the proportion of said monohydric ethylenically unsaturated compound providing a polyethylenically unsaturated oligomer having a molecular weight in the range of about 5,000 to about 30,000.

16. An oligomer as recited in claim 15 in which the ethylenic unsaturations are acrylate unsaturations, said diisocyanate is an aliphatic diisocyanate, and said dihydric bisphenol-based alkylene oxide adduct is a propylene oxide adduct of a bisphenol.

17. An oligomer is recited in claim 16 in which said diprimary amine component is a polyoxypropylene diamine having a molecular weight of from 175 to 400.

18. A radiation-curable liquid coating composition comprising volatile inert organic solvent having dissolved therein the polyurethane, polyurea, polyethylenic oligomer of claim 15 and from 5% to 25%, based on total polymer solids, of polyethylenically unsaturated cross-linking agent for said polyethylenic oligomer, said coating composition being pigmented to contain from 40 to 50 volume percent pigment and having a resin solids content in the range of 5% to 15%.

* * * * *